United States Patent [19]

Moore et al.

[11] 4,440,490

[45] Apr. 3, 1984

[54] COMBINED MASKING FRAME AND PHOTOGRAPHIC SHEET MATERIAL CONTAINER

[75] Inventors: Michael H. Moore, Ilford; Brian F. Moss, Rayleigh; George F. A. M. Turner, Ingatestone, all of England

[73] Assignee: Ciba-Geigy AG, Basel, Switzerland

[21] Appl. No.: 436,254

[22] Filed: Oct. 25, 1982

[30] Foreign Application Priority Data

Nov. 4, 1981 [GB] United Kingdom ............... 8133191

[51] Int. Cl.³ ............................................. G03B 27/58
[52] U.S. Cl. ....................................................... 355/72
[58] Field of Search .................................... 355/72, 74

[56] References Cited

U.S. PATENT DOCUMENTS

| | | | |
|---|---|---|---|
| 1,817,606 | 8/1931 | Bern | 355/72 |
| 2,056,279 | 10/1936 | Kulick | 355/72 |
| 2,290,152 | 0/1942 | Andrews et al. | 95/90.5 |
| 3,813,164 | 5/1974 | Skowron et al. | 355/72 |
| 3,906,966 | 0/1975 | Drake et al. | 134/46 |
| 4,134,666 | 0/1979 | Kikuchi | 354/313 |
| 4,149,800 | 4/1979 | Secreto | 355/72 |
| 4,353,644 | 10/1982 | Taylor | 355/72 |

FOREIGN PATENT DOCUMENTS

671170 of 1952 United Kingdom .

*Primary Examiner*—Monroe H. Hayes
*Attorney, Agent, or Firm*—Harry Falber

[57] ABSTRACT

A combined masking frame and photographic sheet material container comprises an elongated flat compartment for storing photographic sheet material and which has a side opening for removing sheets therefrom; the container has a top panel which has a rectangular recess therein having a planar light-reflecting surface and being of a shape to accomodate the sheets stored in the compartment. The container has hingedly attached thereto a lid which, in closed position, covers the top panel; the lid has along a front side an angular flange which when the lid is closed covers in a light-tight manner the side opening in the container, there being present in the lid a rectangular aperture of an area slightly smaller than the area of the recess so as to form a mask around the edge of a sheet in position in the recess. In a double container, a second compartment, lid and recess can be provided in upside down arrangement at the bottom of the first compartment, the side opening of the second compartment being located below the closed end wall of the first compartment and viceversa.

5 Claims, 3 Drawing Figures

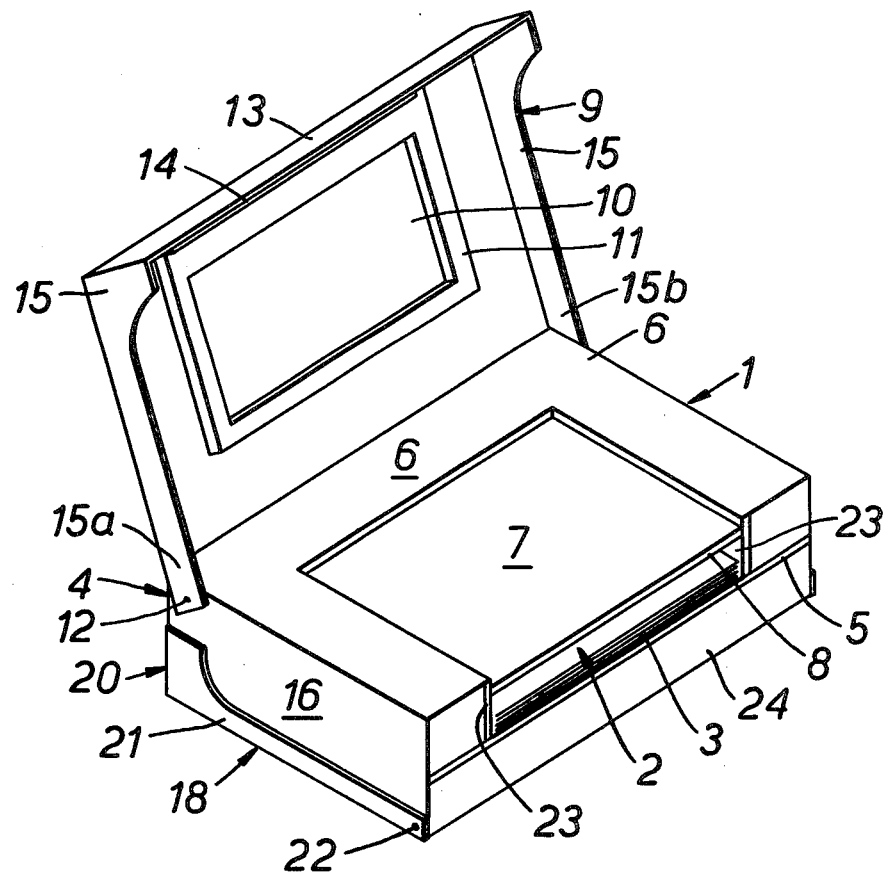

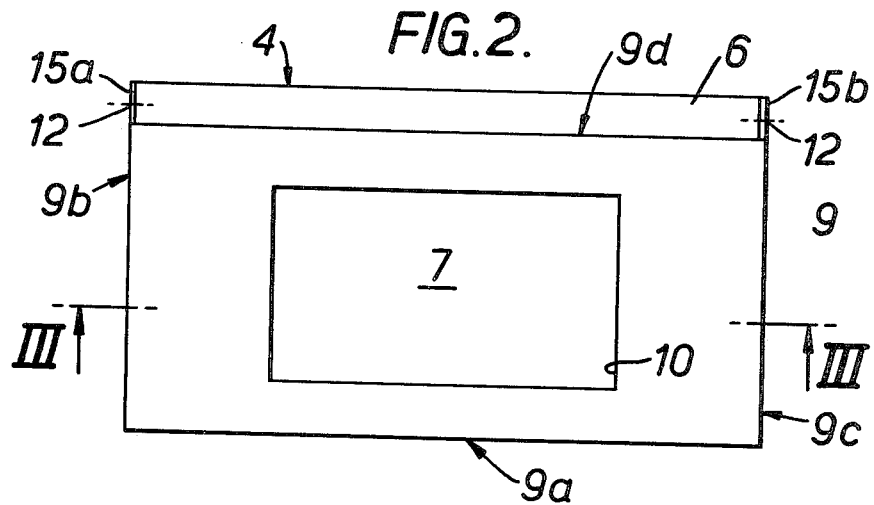
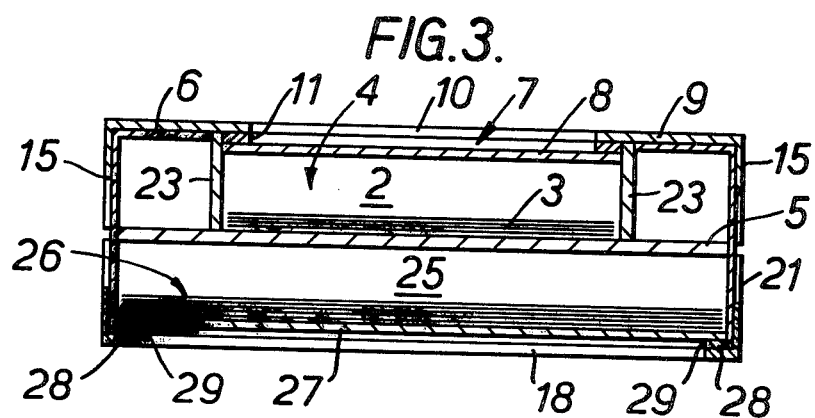

COMBINED MASKING FRAME AND PHOTOGRAPHIC SHEET MATERIAL CONTAINER

BACKGROUND OF THE INVENTION

This invention relates to a combined masking frame and photographic sheet material container having a top face and a bottom face and comprising a storage space having a side opening for removing sheets of the said material stored in the storage space, and flat panel means in at least one of the top and bottom faces, such panel having rectangular recess therein of a size adapted for accomodating a sheet of the stored material, which recess has a light-reflecting planar recess floor surface.

A number of combined masking frame and photographic sheet material containers have been described for example in U.S. Pat. No. 4,149,800, in French Pat. No. 839,959, in British Pat. No. 1,169,185 and in U.S. Pat. No. 2,385,911. In these publications, sensitized paper is either stored in a drawer under the masking frame or in a box having a separate hinged opening panel. Such combined masking frame and photographic sheet material containers are complex in design and it is not easy to withdraw paper from the container under the masking frame.

OBJECTS AND SUMMARY OF THE INVENTION

It is therefore an object of the invention to provide a combined masking frame and photographic sheet material container of the initially described type, in which the withdrawal of sheets of photographic material is greatly simplified.

This is of special importance when such combined devices are placed inside a photographic enlarger for use in bright light. This enlarger comprises a light-tight cover or casing, and the user has to reach with his hands through two hand holes in a wall of the casing and to manipulate the combined device, withdrawing a sheet of photographic printing paper therefrom and placing it under the masking frame to expose it to the light passing through a photographic negative. It is, therefore, very important that the withdrawal of the sheets and placing under the masking frame be as simple as possible and that this manipulation can be repeated several times without the need of each time removing the combined device from the interior of the enlarger.

This object and others that will become apparent as the description of this invention proceeds, are attained, in accordance with the instant invention, in a combined masking frame and photographic sheet material container of the initially described type, which comprises lid means being hingedly attached to at least one of the top and bottom faces of the container, in such a manner as to cover, when in closed position, the flat panel means in the respective container face to which it is attached, each lid means present comprising a lid having a rectangular opening, hinge means on one side of the lid for connecting the lid to the container, and an angular flange depending from the side of the lid opposite the said hinge means and adapted for covering the side opening in a light-tight manner when the lid is in closed position, and wherein the aforesaid rectangular lid opening is of somewhat smaller area size than the said recess, whereby the lid is adapted to serve as a masking frame around the edges of a sheet of the photographic material which has been placed in the recess, and the container and lid are composed of opaque material.

The opaque material from which the container and the lid means are made is preferably selected from polystyrene, polypropylene, and acrylonitrile-butadiene-styrene copolymer having an admixture of carbon black.

In preferred embodiments, the combined device according to the invention has at least one or several of the following features:

The container can comprise holding means for holding a sheet of the photographic material in the recess centrally with regard to the rectangular lid opening.

The storage space can comprise a top chamber and a bottom chamber superimposed one above the other and a common intermediate wall between said two chambers, while the flat panel means comprise a first panel in the top face and covering the top chamber, and a second panel in the bottom face of the container and covering from below the bottom chamber, whereby each of the first and second panels have one of the said recesses therein, and the lid means comprise a first and a second one of the said lids, which lids respectively cover, in closed position, the first panel and the second panel.

In embodiments showing the last-mentioned features of a container having two storage chambers, the top chamber can be open on a first side of the container which is opposite that (second) side thereof to which the first lid is hingedly attached to cover the said top face when in closed position, whereas the said bottom chamber is open at the last-mentioned (second) side of the container, while the second lid is hingedly attached to the above-mentioned first side of the container to cover the bottom face when in closed position.

Further details and advantages of a preferred embodiment of the combined device according to the invention will be explained hereinafter in relation with the accompanying drawing in which FIG. 1 is a perspective view of the combined masking frame and photographic sheet material storage box of the present invention, wherein one lid of the combined device is shown in a partially raised position;

FIG. 2 is a top plan view of the combined device showing one masking aperture,

FIG. 3 is a cross-sectional view of the combined device along a plane indicated by the line III—III of FIG. 2.

In all the figures the same numbers have the same signification.

In FIG. 1 there is shown the double container 1 which has a first compartment 2 for the storage of a stack of photographic paper 3.

When the lid 9 is open the compartment 2 is open at the front while its rear end is closed by a fixed wall 4. Underneath the compartment 2, the back wall 24 of a second compartment 25 (FIG. 3), which compartment serves for storing a stack of larger sheets of photographic material, is visible. The two compartments share a common floor panel 5.

In the top panel 6 of the compartment 2 there is present a recess 7 which has a planar light-reflecting floor surface. The lid 9 which has in its center a rectangular aperture 10, bears along its front edge 9a a dependent flange 13, and at its two lateral edges 9b and 9c dependent lateral flanges 15 which have extensions beyond the rear edge 9d of the lid 9 in the shape of two arms 15a and 15b; these arms 15a and 15b are pivotally mounted on pivot pins 12 on the left hand and on the right hand sidewalls 16, respectively, of the container 1. The aperture 10 of the lid 9 is surrounded by inwardly bent, flange-like rim sections which constitute a masking frame 11 and which protrude into the recess 7 when the lid 9 is in closing position.

When the lid 9 is closed, a special sealing element 14, provided at the lower edge of the dependent flange 13, is in light-tight contact with, the frontal rim of the bottom wall 5, the open frontal face of the compartment 2 is covered by the lid flange 13 and is thereby closed light-tight. The lateral flanges 15 overlap the upper regions of the container sidewalls 16.

In the top view of the container 1 shown in FIG. 2 with the lid 9 being closed there can be recognized that a rearward edge 9d of the lid 9, which edge 9d extends between the two arms 15a and 15b, leaves uncovered a zone at the rear edge of the top panel 6 which zone extends between the two pivot pins 12. In this case, the floor face of the recess 7 in the top panel 6 is visible through the aperture 10 in the lid 9, while the regions of the lid 9 which surround the aperture 10 constitute a masking frame.

A sheet 3 of photographic paper can be placed in the recess 7, and be held in the correct position by means of the masking frame 11 resting upon the margins of the sheet 3 (FIG. 3).

The floor 8 of the recess 7 is mounted laterally in transverse sidewalls 23 of the compartment 2. Also shown in FIG. 3 is the lower second compartment 25 in which is present a stack of photographic sheet material 26 which is of a larger size than that of sheets in the stack of sheet material 3 present in the compartment 2 thereabove.

The lower compartment 25 is closed by the rear wall 25 below the open front side of the compartment 2, while the front side of the second compartment 25 underneath the rear wall 4 of the compartment 2 is open. The underside of the container 1 is constituted by a covering panel 28 which, similar to the top panel 6, contains a recess 27 which, however, is of larger size than the recess 7, in order to accomodate a larger size sheet from the stack 26 therein.

In the position of the container 1 shown in FIGS. 1 and 3, the cover plate 28 is covered by a lid 18 whose frontal rim has an angularly attached flange 20 which closes the open frontal side of the compartment 25, in the closing position as shown, just as light-tight as does the flange 13 in the case of compartment 2. Lateral flanges 21 extend on the rear side of the compartment 25 beyond the rear edge of the lid 18 and are hingedly mounted on pivot pins 22, while, in the closing position of the lid 18 shown in FIGS. 1 and 3, they cover the lower region of the lateral sidewalls 16 of the container 1 in a light-tight manner.

Limiting frame pieces 29 can be fitted in the recess 27 and serve the same purpose as the small frame pieces of the masking frame 11.

In operation the size of the print is decided and the container 1 is turned so that the compartment 2 or 25 which contains the sheet material of this size is placed upmost. The container 1 is then placed under the enlarger and the picture is composed as usual on the light reflecting focussing area of the appropriate recess. The light is then switched off and the lid is raised and a sheet of print material is removed from the compartment 2 or 25, as the case may be, and placed in the corresponding recess 7 or 27. The lid 9 or 18 is then closed to hold the print material in place and an exposure is made.

We claim:

1. A combined masking frame and photographic sheet material container having a top face and a bottom face and comprising a storage space having a side opening for removing sheets of said material stored in said space, flat panel means in at least one of said top and bottom faces, said panel means having a rectangular recess therein of a size adapted for accomodating a sheet of said stored material, said recess having a light-reflecting planar recess bottom surface, lid means being hingedly attached to at least one of the top and bottom faces of said container, in such a manner as to cover, when in closed position, the flat panel means in the respective container face to which it is attached, each lid means present comprising a lid having a rectangular opening, hinge means on one side of said lid for connecting said lid to said container, and an angular flange depending from the side of said lid opposite said hinge means and adapted for covering said side opening in a light-tight manner when said lid is in closed position, said rectangular lid opening being of somewhat smaller area size than said recess, whereby said lid is adapted to serve as a masking frame around the edges of a sheet of said material placed in said recess, said container and lid being composed of opaque material.

2. The combined masking frame and photographic sheet material container of claim 1, wherein said opaque material is selected from polystyrene, polypropylene and acrylonitrile-butadiene-styrene copolymer having an admixture of carbon black.

3. The combined masking frame and photographic sheet material container of claim 1, wherein said container further comprises holding means for holding a sheet of said material in said recess centrally with regard to said rectangular lid opening.

4. The combined masking frame and photographic sheet material container of claim 1, wherein said storage space comprises a top chamber and a bottom chamber superimposed one above the other, and a common intermediate wall between said two chambers, said flat panel means comprising a first panel in said top face and covering said top chamber and a second panel in said bottom face of said container and covering from below said bottom chamber, each of said first and second panels having one of said recesses therein, and said lid means comprising a first and a second one of said lids which lids respectively cover, in closed position, said first panel and said second panel.

5. The combined masking frame and photographic sheet material container of claim 4, wherein said top chamber is open on the side of said container which is opposite that side thereof to which said first lid is hingedly attached to cover said top face when in closed position, and wherein said bottom chamber is open at the last-mentioned side of said container, while said second lid is hingedly attached to the first-mentioned side of said container to cover said bottom face when in closed position.

* * * * *